June 5, 1934.  A. CHURCHWARD  1,961,197
WELDING APPARATUS
Filed Aug. 19, 1932   3 Sheets-Sheet 1

INVENTOR-
Alexander Churchward
BY
Williams, Rich & Morse
ATTORNEYS

Patented June 5, 1934

1,961,197

UNITED STATES PATENT OFFICE 1,961,197

WELDING APPARATUS

Alexander Churchward, South Orange, N. J., assignor to Wilson Welder & Metals Company, Inc., North Bergen, N. J., a corporation of New York Application August 19, 1932, Serial No. 629,478

24 Claims. (Cl. 219—8)

The present invention relates to direct current arc welding apparatus and has for an object to provide an apparatus of this character which is simple in construction, inexpensive to manufacture and reliable in its operation.

It is well-known to those skilled in the art of electric arc welding that desirable features of an arc welding apparatus are high open-circuit or "striking" voltage, to start the arc at the work; and a decrease of voltage with increase of current from open-circuit to short-circuit conditions, to provide the proper operating voltage across the arc and the proper operating welding current when welding conditions are reached and the proper short-circuit current through the work in view of the unavoidable momentary short-circuits occurring at the work when welding. Of the two types of current, alternating current is the usual supply available, and heretofore a motor-generator set has been generally used to supply the required direct current in a welding circuit. The generator has been equipped with various fields or additional apparatus has been employed to bring about such reduction of voltage from open-circuit to short-circuit conditions. The typical case of a welding generator, equipped with a bucking series field and a separately excited field, calls for an additional generator or exciter for supplying the excitation to the separately excited field; and, when operating such an apparatus, disturbances such as reversal or breakdown of current in the circuit of the exciter which includes the separately excited field winding, and in the welding circuit which includes the bucking series field winding, very often occur as a result of undue inductive reaction between the separately excited field winding and the bucking series field winding.

The present invention eliminates the need of generators and other associated parts in direct current arc welding and their attendant disadvantages including their comparatively high cost of manufacture and their relatively high energy consumption or operating losses.

Another object of the invention is to provide a simple rectifying apparatus for direct current arc welding, involving no rotary parts and providing an automatic lowering of its output voltage with increase of current in the welding circuit from open-circuit to short-circuit conditions.

A further and important object of the invention is to provide a rectifying apparatus of the character mentioned, having a drooping characteristic curve of current-voltage output, i. e. a curve the slope of which increases, or along which the voltage decreases at a rate increasingly greater, from open-circuit to short-circuit conditions. The drooping effect is particularly pronounced from welding conditions under normal length of the welding arc to short-circuit conditions. By such a characteristic, the apparatus is made to provide a much less current increase from welding conditions under normal length of the welding arc to short-circuit conditions than if the voltage decreased at either a constant or diminishing rate. It has been determined that, by so limiting the short-circuit current in the welding circuit, the life of the rectifying apparatus is materially increased.

Another important object of the invention is to provide a rectifying apparatus of the character mentioned, which utilizes such means for lowering its output voltage as to cause a minimum effect on the power factor in the line from which it derives its current.

A further object of the invention is to provide a rectifying apparatus of the character mentioned, having the proper falling characteristic curve for any operating welding current (the current in the welding circuit under normal length of the welding arc). Thus, the apparatus permits the operating welding current to be adjusted to the value which the particular work requires, and, whatever the value of such operating current may be, provides the proper decrease in its output voltage with increase of current in the welding circuit from open-circuit to short-circuit conditions.

A still further object of the invention is to provide a rectifying apparatus of the character mentioned, involving minimum operating losses.

The invention will be understood with the aid of the following description taken in connection with the accompanying drawings, in which.

In accordance with the invention, arc welding energy is supplied to the work from an alternating current source through a full wave rectifier, whereby a direct current is caused to flow through the welding circuit. A transformer arrangement of special construction is inserted between the source and the input terminals or anodes of the rectifier. The apparatus includes two output terminals, one of which is connected to the output terminal or cathode of the rectifier and constitutes the positive output terminal. The negative output terminal is in electrical connection with both anodes of the rectifier through equal impedances (which may comprise balanced portions of the output of the transformer arrangement). The two output terminals are connected in the welding circuit which includes a reactance.

The transformer arrangement preferably includes a main transformer for transmitting voltage to the rectifier, but comprises as an essential part a transformer or transformer means the mutually coupled windings of which both function to variably reduce the voltage supplied to the rectifier upon increase of current in the welding circuit, whereby a continuous lowering of the rectified voltage from open-circuit to short-circuit conditions at the work is provided. The opposing action of said transformer or transformer means on open-circuit is comparatively small or nil, thereby permitting the proper high open circuit or "striking" voltage to be impressed across work and electrode to start the arc therebetween. As will be hereinafter more particularly described, by said transformer or transformer means a considerable voltage opposition is produced and the voltage opposition is such as to cause a considerable drooping effect on the current-voltage output characteristic curve of the apparatus, these results being nevertheless accomplished without unduly lowering the power factor in the alternating current line. A variable rheostat means, operatively associated with said transformer means, permits a wide range of operating welding currents and the desired decrease in voltage from open-circuit to short-circuit conditions for whatever value of the operating welding current is obtained as a result of its adjustment.

Figure 1:
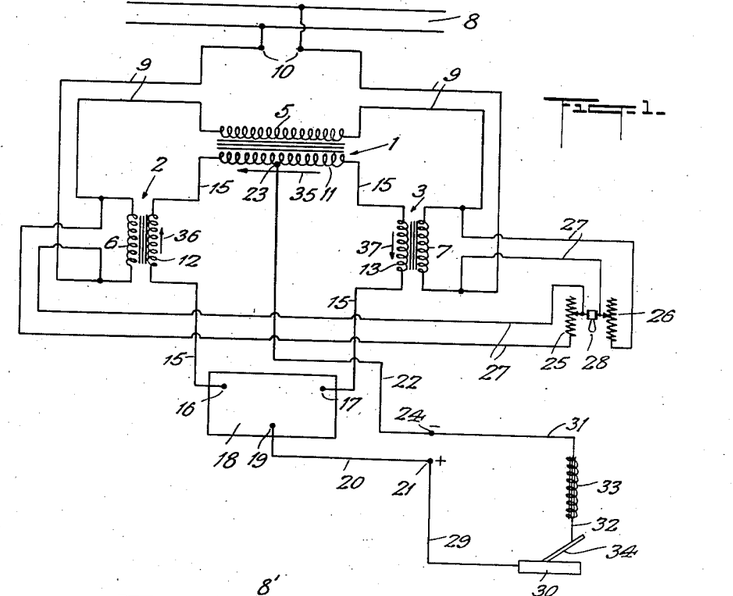
Figs. 1, 2, 3, 4 and 5 show diagrammatically five embodiments of the invention respectively.

In the embodiment of the invention shown in Fig. 1, three transformers 1, 2 and 3 are utilized, the latter two, 2 and 3, being identical in design in every respect to one another. The respective primaries 5, 6 and 7 of the three transformers are connected by the conductors 9 in series with one another and with the input terminals 10 connected to a suitable alternating current source 8. The respective secondaries 11, 12 and 13 of the three transformers are connected by the conductors 15 in series with one another and with the input terminals or anodes, 16 and 17, of a full wave rectifier 18, which may be of the type known as a mercury arc or mercury vapor rectifier. As made clear in the drawings, the secondary 11 of the transformer 1 is operatively disposed between the secondaries 12 and 13 of the transformers 2 and 3, i. e. the windings 12 and 13 of the transformers 2 and 3 are each connected between an anode of the rectifier 18 and the winding 11 of the transformer 1. The cathode or output terminal 19 of the rectifier 18 is connected by a conductor 20 to a terminal 21, constituting the positive output terminal of the apparatus. The secondary winding 11 of the transformer 1 is center-tapped and its center point 23 is connected by a conductor 22 to a terminal 24, constituting the negative output terminal of the apparatus. As will be more clearly understood hereinafter, the transformer 1 provides the proper open-circuit voltage at the output terminals of the apparatus, and the transformers 2 and 3 operate alternately (but at times conjointly) to produce an automatic lowering of the output voltage of the apparatus from open-circuit to short-circuit conditions, the symmetrical arrangement of the latter two transformers insuring the balanced conditions necessary for voltage reduction at any instant and a rectified current of a continuous and positive character. Two identical rheostats 25 and 26 are respectively associated with the transformers 2 and 3, and in the embodiment of the invention shown, they are respectively connected in parallel by conductors 27 with the primaries 6 and 7 of said two transformers. As will be more clearly understood hereinafter, the rheostats 25 and 26 permit an adjustment of the operating welding current to be selected for the particular work to be welded and should be operated conjointly, to assure balanced conditions, as by the common handle 28. Obviously the usual means (not shown) are provided for initiating the discharge in the rectifier 18, i. e. starting the arc between the cathode 19 and one or the other of the anodes 16 and 17.

In using the apparatus in a welding circuit, its positive terminal 21 may be connected by a conductor 29 to the work 30, and its negative terminal 24 by conductors 31 and 32 through a reactance or current-steadying means 33 to the welding electrode 34. The inductance 33 functions in the usual manner to steady the welding arc at the work 30, but also functions in the usual manner to create an overlap of the two anode currents in the two halves of the input circuit of the rectifier 18, which is essential for maintenance of the arc in said rectifier.

The respective secondaries 11, 12 and 13 of the transformers 1, 2 and 3 are so interconnected that the electromotive forces induced by transformer action in the secondaries of the transformers 2 and 3 oppose the electromotive force induced by transformer action in the secondary of the transformer 1, so that the windings 12 and 13 each act as a bucking series winding decreasing the voltage supplied by the winding 11 to the rectifier anodes 17 and 18 (see the arrows 35, 36 and 37 having reference respectively to said induced electromotive forces in the secondaries 11, 12 and 13 at a certain instant).

The resultant voltage impressed across the rectifier anodes 16 and 17 is an alternating voltage wave, and the rectifier 18 acts to reverse the negative half of this wave, the rectified wave being impressed across the output terminals 21 and 24. In other words, the rectifier 18 permits flow of current from either anode 16 or 17 to the cathode 19, but checks any current flow from the cathode 19 to either anode 16 or 17. Thus, during certain periods of time, corresponding to positive potential at the anode 16, current flows from the center point 23 through half of the winding 11 (to the left in Fig. 1), through the winding 12 and through the rectifier 18 (from its anode 16) to the cathode 19. Also during certain periods of time, corresponding to positive potential at the anode 17, current flows from the center point 23 through the other half of the winding 11 (to the right in Fig. 1), through the winding 13 and through the rectifier 18 (from its anode 17) to the cathode 19. Obviously, each of these two anode currents passes from the cathode 19 through the circuit including the work 30, the electrode 34 and the reactance device 33, back to the center point 23. Said anode currents, although unidirectional, have a wave form, i. e. they increase from zero to a maximum value and thereafter decrease to zero. However, due to the inductance of the device 33, their waves are so affected as to cause one to persist for a time after the other is initiated, so that the resultant current flowing from the cathode 19 through the welding circuit (the sum of the two waves) is a direct current continuously maintained and having no periodic changes of appreciable magnitude. This overlapping of the two anode currents maintains the arc in the rectifier 18 and is to a certain extent assisted by the inductance provided in their respective paths by the transformer windings 11, 12 and 13. It is to be noted that the rectified voltage across the output terminals 21 and 24, although unidirectional, is not continuous, but is of an intermittent and pulsating character. However, with the inductance 33 in the welding circuit, the voltage across the work 30 and electrode 34 is a direct current voltage continuously maintained and having no periodic changes of appreciable magnitude. It is to be particularly noted that the transformers 2 and 3, the purpose and function of which will be hereinafter more particularly described, do not alter the balanced conditions necessary for a direct current welding arc, because of their identical construction and because they are located, respectively, in the paths of the two anode currents in the branches of the input circuit of the rectifier on either side of the neutral point 23.

It is observed that the current taken from the line 8 by the primary circuit including the windings 5, 6 and 7 varies substantially as the load which the apparatus is called to deliver or the current which it supplies in the welding circuit. At no load or open-circuit, i. e. when the apparatus is supplying no current to the work 30, the current in said primary circuit is very small. Upon striking the arc, however, the current taken from the source 8 becomes of an appreciable magnitude. Now the transformers 2 and 3 are so designed as to operate on open-circuit below saturation of their respective magnetic cores, which permits, as will be presently understood, an increase of flux in said cores, and a corresponding reduction of the voltage supplied to the rectifier 18, from open-circuit to short-circuit conditions at the work. First consider the case of the transformer 2. During the periods of time when its secondary 12 is open-circuited (when no anode current is flowing), the increase of current in the primary circuit from open-circuit to short-circuit conditions at the work 30 increasingly magnetizes its core, so that correspondingly the counter-electromotive force in its primary 6 is caused to increase from open-circuit to short-circuit conditions at the work 30. Because of the fact that the anode current flows most of the time in such a direction as to further magnetize the core it follows that, during the periods of time when the anode current is flowing, both the electromotive forces in the secondary 12 and in the primary 6 are caused to increase from open-circuit to short-circuit conditions at the work 30; and it is to be noted that those electromotive forces are each of large magnitude, because of their being each dependent upon the total flux in the core cumulatively produced by both the primary current and the anode current. In view of the identical construction of the transformers 2 and 3 and their location respectively in the paths of the two anode currents, the transformer 3 functions in the same manner as (but 180 electrical degrees out of phase with) the transformer 2. Therefore, as a result of the special construction of the transformers 2 and 3, the voltage impressed on the primary 5 of the main transformer 1 is increasingly reduced by the counter-electromotive forces in the primaries 6 and 7 of the transformers 2 and 3, and, moreover, the corresponding voltage across the secondary 11 of the main transformer 1 is increasingly opposed by the electromotive forces in the secondaries 12 and 13 of the transformers 2 and 3, from open-circuit to short-circuit conditions at the work 30. Thus, in designing the transformers 1 and 2, the number of turns to be provided in their primary windings and the volume of iron (with reference to the length and cross-section of the magnetic path) to be provided in their magnetic cores should be carefully considered. Obviously, the main transformer 1 operates as the usual transformer in full-wave rectifying apparatus, except for reduction of its primary voltage and opposition of its secondary voltage. The transformers 1, 2 and 3 are so designed that the sum of the secondary voltages of the transformers 2 and 3 is at all times, i. e. from no-load to maximum load conditions, predeterminedly smaller than the secondary voltage of the transformer 1. Preferably the no-load or open-circuit secondary voltage of either of the transformers 2 and 3 is caused to be negligible as compared to the no-load or open-circuit voltage of the transformer 1.

It now becomes apparent that at no-load, with the transformers 2 and 3 transmitting substantially no output voltages, the transformer 1 functions to transmit a high voltage to the rectifier, the corresponding rectified voltage across the work 30 and electrode 34 providing the proper "striking" voltage to start the welding arc. Upon striking the arc, the transformers 2 and 3 function, as has been explained, to decrease the voltage transmitted to the rectifier. There is thus produced at the work an automatic continuous lowering of voltage with increase of current from open-circuit to short-circuit conditions in the welding circuit. The apparatus is so designed that the proper operating voltage and current values are reached under normal length of arc. The reactance 33, besides steadying the welding arc and its current smoothing action, retards the lowering of voltage and corresponding increase of current upon striking the arc, i. e. permits working conditions to be reached gradually. It is to be particularly noted that the transformers 2 and 3 function in both the primary circuit of the main transformer 1 and in the secondary circuit of the main transformer 1 to reduce the voltage supplied to the rectifier 18, because of their operating as transformers this considerable voltage reduction is obtained without unduly lowering the power factor in the alternating current line 8. Furthermore, they cause considerable drooping in the falling characteristic curve of the current-voltage output of the apparatus. It is observed that, as the current increases, and because of their operating on open-circuit much below saturation of their cores, the magnetic property (permeability) of their cores is increasingly improved, so that this fact alone provides more flux in their cores and increases the voltage reduction. The drooping effect is very pronounced from the operating welding current to the short-circuit current, so that the short-circuit current is not very much greater than the operating welding current. The life of the rectifying device 18 is therefore considerably increased. Further the operating losses, inherent in the operation of the transformers 2 and 3, are small.

As has already been stated, a selection of the operating welding current is provided by the rheostats 25, and 26, which should be operated conjointly. This rheostat means does not in itself vary the current in the welding circuit which is dependent on the resistance of said circuit or the character of the work 30. However, an adjustment of the rheostats 25 and 26 operates to provide the proper value of flux in the cores of the transformers 2 and 3 and thus the proper reduction of the voltage supplied to the rectifier 18, for any particular type of work to be welded or any operating value of current which the apparatus is called to deliver, so that the desired decrease in the output voltage of the apparatus from open-circuit to short-circuit conditions at the work and the proper value of voltage across normal length of arc are provided for any operating welding current. Thus, the rheostat means 25 and 26 enables the proper operating welding current to be selected, it functioning in a manner similar to the usual rheostat in shunt with a bucking series field winding in a welding generator. The same high open-circuit or "striking" voltage of the apparatus is maintained for any operating welding current established by an adjustment of the rheostat means 25 and 26. It is apparent to those skilled in the art that proper selection of the operating welding current may also be obtained by a variation of the number of turns of the transformer primary means 6 and 7.

Figure 2:
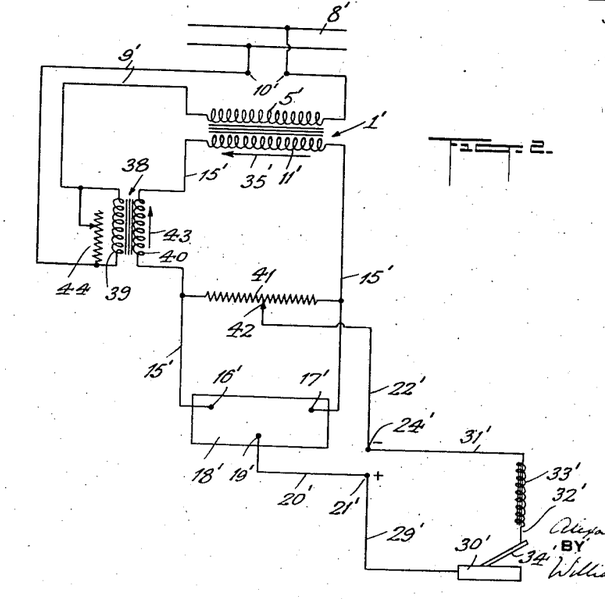

The embodiment of the invention shown in Fig. 2 comprises a transformer 1' providing the open-circuit voltage of the apparatus and a single transformer 38 providing an automatic lowering of the output voltage with increase of output current from open-circuit to short-circuit conditions. The respective primaries 5' and 39 of said transformers 1' and 38 are connected in series with one another and with the input terminals 10' by the conductors 9'. Said terminals 10' are connected to the alternating current source 8'. The respective secondaries 11' and 40 of the transformers 1' and 38 are connected by the conductors 15' in series with one another and with the input terminals 16' and 17' of the full-wave rectifier 18'. Here, a potentiometer 41 is connected across the anodes 16' and 17'. The center point 42 of this potentiometer is connected by the conductor 22' to the negative output terminal 24'. The positive output terminal 21' is connected by the conductor 20' to the cathode 19'. The welding circuit is completed by connecting the work 30' by the conductor 29' to the terminal 21' and the reactance 33' by the conductors 31' and 32', respectively, to the terminal 24' and to the welding electrode 34'.

The operation of the arrangement shown in Fig. 2 is evidently similar to that shown in Fig. 1. Obviously, the potentiometer 41 permits both anodes 16' and 17' to operate alternately through the same potentials, insuring a supply of current in the welding circuits of a continuous character. The electromotive force induced in the secondary 11' of the main transformer 1' is opposed by the electromotive force induced in the secondary 40 of the additional transformer 38 (see the arrows 35 and 43). Before striking the arc, the transformer 38 operates below saturation of its magnetic core. Upon striking the arc, current flows at all times in the secondary 40 and assists the current in the primary 39 in magnetizing the core of the transformer 38. Therefore, the voltage impressed across the primary 5' of the main transformer 1' is increasingly reduced by the counter-electromotive force in the primary 39, and the corresponding voltage across the secondary 11' of the main transformer 1' is increasingly opposed by the electromotive force induced in the secondary 40, from open-circuit to short-circuit conditions at the work 30'. There is thus obtained an automatic lowering of output voltage with increase of current from open-circuit to short-circuit conditions in the welding circuit, the reactance 33' again causing an overlap in the two anode current waves, the welding arc to be steadied and working conditions to be reached more gradually. The rheostat means 44 likewise provides proper selection of the operating welding current for the particular work to be welded.

Figure 3:
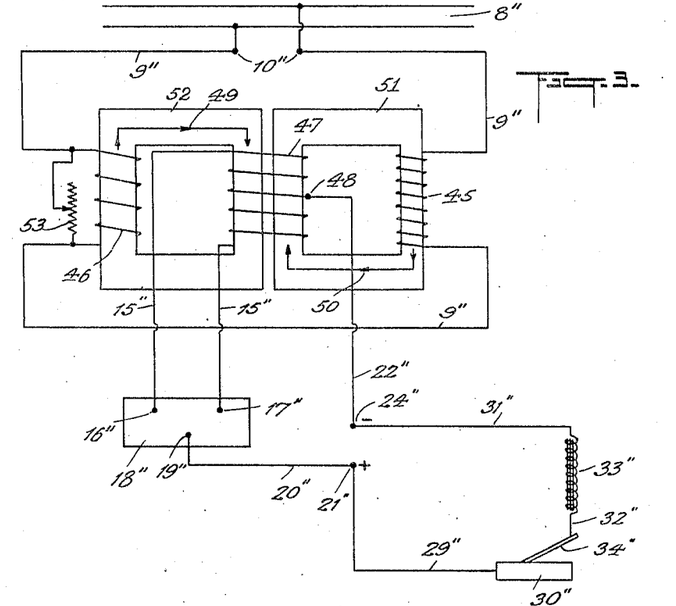

A third transformer arrangement consisting of two transformers having a common secondary winding is shown in Fig. 3. The primaries 45 and 46 of said two transformers are connected, as before, in series by conductors 9'' with the input terminals 10'' connected to the alternating current line 8''. A single secondary 47 cooperates with both primaries 45 and 46 and is connected by conductors 15'' to the anodes 16'' and 17'' of the full-wave rectifier 18''. The center-point 48 of the single secondary 47 is connected by the conductor 22'' to the negative output terminal 24''. The cathode 19'' is connected by conductor 20'' to the positive output terminal 21''. Current is supplied from this terminal 21'' to the work 30'' by the conductor 29'', the reactance 33'' being connected by the conductors 31'' and 32'', respectively, to the terminal 24'' and to the electrode 34''.

The primaries 45 and 46 are so connected to one another that the flux (see the arrows 49 having reference to its direction at a certain instant) produced in the core 51 by the winding 45 is opposite in direction to the flux (see the arrows 50 having reference to its direction at said instant) produced in the core 52 by the winding 46. Thus the electromotive forces respectively induced by said primaries in the mutual secondary 47 oppose one another, the two transformers being so designed that the electromotive force induced in the mutual secondary 47 by the flux in the core 51 is at all times greater than that induced by the flux in the core 52. Consequently, the transformer, including the primary 45 and the core 51, supplies voltage to the rectifier anodes 16'' and 17'', and the transformer, including the primary 46 and the core 52, opposes the voltage supplied to the rectifier anodes 16'' and 17''. On open-circuit (when no current is flowing in the welding circuit) the core 52 is operated much below saturation, as by properly selecting the number of turns in the winding 46 and the cross-section per unit length of magnetic circuit of the core 52. The two anode currents flow respectively in the two branches of the winding 47 (on either side of the center point 48), this arrangement providing the balanced conditions necessary for a rectified current in the welding circuit of a continuous character. Most of the time, either one of these anode currents flows in such a direction as to further magnetize the core 52, so that the opposing electromotive force in the winding 47 (produced by the core 52) and the counter-electromotive force in the primary 46 are caused to increase from open-circuit to short-circuit conditions at the work 30''. Correspondingly, the voltage supplied by the mutual secondary 47 to the rectifier 18'' is increasingly reduced, because of both the increasing reduction of voltage across the primary 45 by the counter-electromotive force in the primary 46 and the increasing reduction of the corresponding electromotive force in the winding 47 (produced by the core 51) by the opposing electromotive force in the same winding 47 (produced by the core 52). The transformer arrangement is preferably so designed that the electromotive force induced in the secondary 47 by transformer action from the primary 46 is small or negligible on open-circuit. Consequently, the transformer, including the primary 45 and the secondary 47, provide the proper open-circuit or "striking" voltage to start the arc at the work 30" and the transformer, including the primary 46 and the secondary 47, provide an automatic continuous lowering of the voltage across the welding arc from open-circuit to short-circuit conditions. The reactance 33" again serves the function of steadying the welding arc, overlapping the two anode currents and retarding increase of current in the welding circuit. The rheostat means 53 again permits any drooping characteristic of voltage with current to be obtained, i. e. a selection of the operating welding current.

Figure 4:
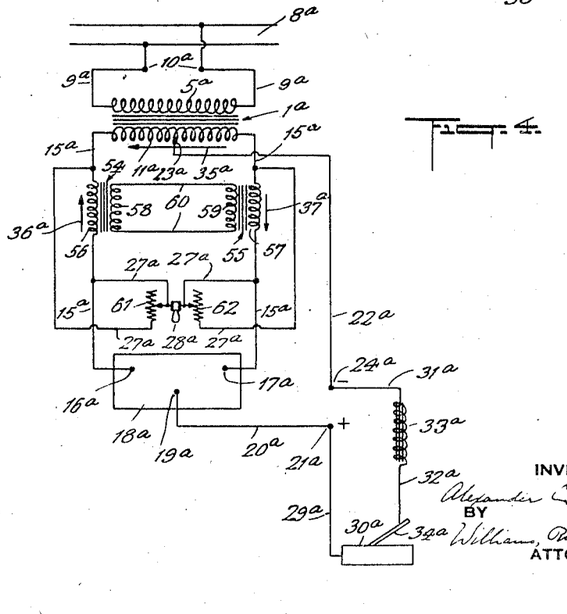

In the embodiment of the invention shown in Fig. 4, the primary 5a of the transformer 1a (supplying the open-circuit voltage of the apparatus) is connected, alone, by the conductors 9a to the input terminals 10a. The latter are connected, as before, to the alternating current source 8a. Two identical transformers 54 and 55 are utilized to lower the voltage with increase of current in the welding circuit. The respective windings 56 and 57 of said transformers 54 and 55 are connected by the conductors 15a in series with the secondary 11a of the transformer 1a and also with the anodes 16a and 17a of the full-wave rectifier 18a. These windings 56 and 57 are identical to one another and are oppositely disposed in the two sides of said rectifier-input circuit between the winding 11a and the rectifier 18a, i. e. in the paths of the two anode currents respectively. The other windings 58 and 59 of the transformers 54 and 55, also identical to one another, are connected in a closed circuit by the conductors 60. Two identical rheostats 61 and 62 are respectively connected in parallel by conductors 27a with the windings 56 and 57 and are operated conjointly by the handle 28a. The cathode 19a is connected by conductor 20a to the positive output terminal 21a and the center-point 23a of the winding 11a is connected by conductor 22a to the negative output terminal 24a. As before, the conductor 29a, the work 30a, the electrode 34a, the conductor 32a, the reactance 33a and the conductor 31a complete the welding circuit.

As before, the main transformer 1a is so designed that its output or secondary voltage is of an appreciable magnitude on open-circuit. In this embodiment, its primary voltage is not decreased and its secondary voltage is therefore substantially constant from open-circuit to short-circuit conditions at the work 30a. Obviously, the counter-electromotive forces or voltage drops (impedance times current) produced across the windings 56 and 57 as a result of the anode currents flowing therein, act in effect to oppose the secondary voltage of the main transformer, i. e., reduce the voltage supplied by the main transformer to the rectifier 18a. However, it is to be particularly noted that this voltage opposition, because of the inductive coupling of the windings 56 and 57, is considerably greater than would otherwise be the case if said windings were merely operating as separate chokes in the two branches of the input circuit of the rectifier. Thus, when current is flowing in the winding 56, an electromotive force is induced in the winding 58 acting as a secondary of the transformer 54, which causes a current to flow in the closed circuit including the winding 59 and consequently an electromotive force to be induced in the winding 57 acting as a secondary of the transformer 55. Similarly, when current is flowing in the winding 57 an electromotive force is induced in the winding 59 acting as a secondary of the transformer 55, which causes a current to flow in the closed circuit including the winding 58 and consequently an electromotive force to be induced in the winding 56 acting as a secondary of the transformer 54. The various windings of the transformers 54 and 55 are so connected that the induced electromotive force in each of the windings 56 and 57, or that part of the voltage produced across each as a result of their inductive coupling, opposes the secondary voltage of the transformer 1a. Because of the fact that the two anode current waves overlap one another, the establishment of the induced electromotive force in the winding 57 is prolonged over a portion of the period of time that anode current is flowing in said winding 57, and the establishment of the induced electromotive force in the winding 56 is prolonged over a portion of the period of time that anode current is flowing in said winding 56. Thus, not only is the counter-electromotive force or voltage drop across each of the windings 56 and 57 increased, but there is effected an increased reduction of the voltage supplied to the rectifier 18a during current flow from either one of its anodes 16a and 17a, and it is to be particularly noted that this increased voltage opposition is considerable (when welding conditions are reached), because of the fact that simultaneous flow of the two anode currents occurs over a considerable portion of each half cycle of voltage supplied to either one of said anodes. In other words, the resultant current set up in the closed circuit including the windings 58 and 59 so affects or modifies the magnetization of the cores of the transformers 54 and 55 that the counter-electromotive forces in the windings 56 and 57 are considerably increased and corresponding material reduction of the voltage supplied to the rectifier 18a is obtained at full load, without unduly lowering the power factor in the line 8a. Such voltage reduction, if obtained by mere inductances or chokes in the two input branches of the rectifier 18a, would result in an objectionable lowering of the power factor. The arrows 35a, 36a and 37a have reference respectively to the electromotive forces in the windings 11a, 56 and 57 at a certain instant. The transformers 54 and 55, because of their identical construction and their location on either side of the neutral point 23a operate identically to (or 180 electrical degrees out of phase with) one another and therefore preserve the balanced conditions necessary for a rectified current of a continuous character in the welding circuit.

The transformers 54 and 55 are so designed that increasing magnetization of their respective cores is produced by the increase of current in their windings 56 and 57 from open-circuit to short-circuit conditions at the work 30a. Preferably, they are so constructed that the voltage opposition which they cause is slight at the instant the arc is struck. The main transformer 1a therefore functions to create the high open-circuit or "striking" voltage to start the arc at the work 30a. With increase of current in the welding circuit (i. e., increase of the anode currents in the windings 56 and 57), the opposing voltages in the windings 56 and 57 continuously increase in magnitude, consequently continuously reducing the voltage supplied by the main transformer to the rectifier anodes 16a and 17a. There is thus produced a continuous lowering of the rectified voltage from open-circuit to short-circuit conditions at the work 30a.

An adjustment of the rheostats 61 and 62 enables the proper operating welding current to be selected. In other words, they operate to provide the proper final voltages (when welding conditions are reached) across the windings 56 and 57 for any operating welding current, so that the proper drooping characteristic of voltage with current and the proper voltage across normal length of arc may be obtained for any type of work to be welded.

Figure 5:
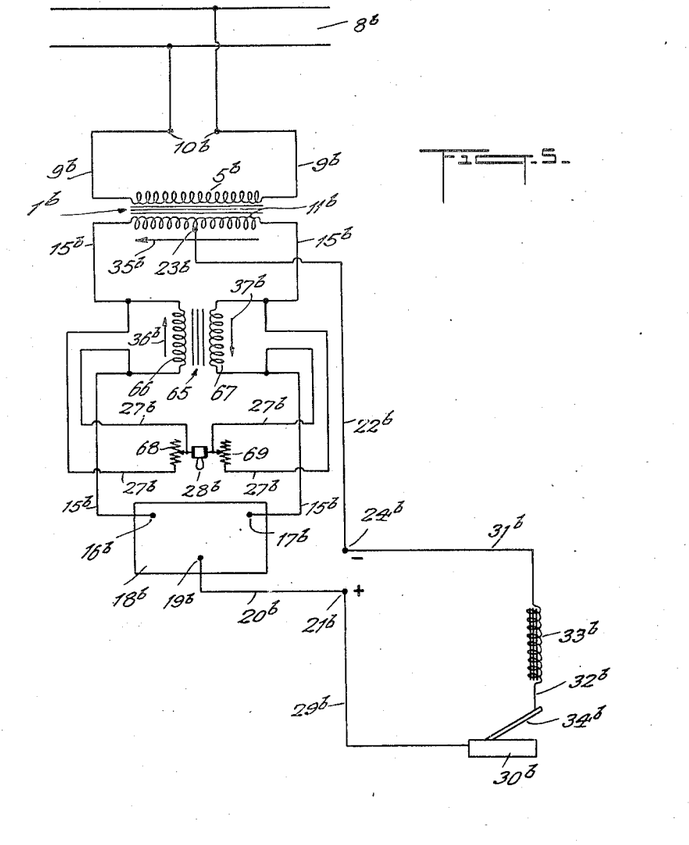

The preferred embodiment of the invention is illustrated in Fig. 5 and comprises a single transformer 65 (taking the place of the two transformers 54 and 55 of Fig. 4), the two windings 66 and 67 of which are identical to each other. Again, the transformer 1b, provides the open-circuit voltage of the apparatus and its primary 5b is connected through the conductors 9b and output terminals 10b to the alternating current line 8b. One end of the secondary 11b is connected by conductors 15b through one winding 66 to one anode 16b of the full-wave rectifier 18b. The other end of the secondary 11b is connected by conductors 15b through the other winding 67 to the other anode 17b of said rectifier. The cathode 19b and the mid-point 23b of the secondary 11b are connected, respectively, by the conductors 20b and 22b to the positive and negative output terminals 21b and 24b. The conductor 29b, the work 30b, the electrode 34b, the conductor 32b, the reactance 33b and the conductor 31b complete the welding circuit.

The operation of the apparatus of Fig. 5 is evidently similar to that of the apparatus of Fig. 4. Here the windings 66 and 67, positioned in the paths of the two anode currents, are directly inductively coupled to one another, but, as before, an electromotive force is induced in the winding 67 as a result of the current flow in the winding 66 and, conversely, an electromotive force is induced in the winding 66 as a result of the current flow in the winding 67. These windings are again so connected that their induced electromotive forces oppose the secondary voltage of the main transformer 1b. Due to the fact that current flows simultaneously in each for a considerable portion of the time, their counter-electromotive forces or the voltage drops across their terminals are considerably increased, as a result of their inductive coupling. Maintenance of balanced conditions at the rectifier anodes, necessary for a continuous rectified current, is obviously provided. The core of the transformer 65 is preferably operated much below saturation at the instant the arc is struck at the work 30b, so that the main transformer 1b provides the high open-circuit voltage to start said arc. With increased magnetization of the core of the transformer 65 with increase of current in the welding circuit, the counter-electromotive forces in its windings 66 and 67 continuously increase to a value materially lowering the voltage across the work 30b and electrode 34b when welding conditions are reached. A continuous lowering of the rectified voltage is effected from open-circuit to short-circuit conditions at the work 30b. As before, the adjustable rheostats 68 and 69, respectively connected in parallel by conductors 27b with the windings 66 and 67 and operated conjointly by the handle 28b, control such decrease of voltage to enable proper voltage and current values to be obtained for the operating welding current which the type of work requires.

Obviously, a satisfactory power factor in the alternating-current line, a falling characteristic of a greatly drooping character, and a limited value of the short-circuit current in the welding circuit, are advantages which are present in each of the five embodiments of the invention illustrated and described herein. Owing to the recognized efficiency of transformers, minimum losses are incurred in the operation of the several embodiments of the invention described herein. The voltage reducing transformer means in Figs. 1, 3, 4 and 5 also have a direct effect on the lengthening of the current wave supplied from each anode of the rectifier and reduce the undulatoriness of the resultant rectified current.

It is to be understood that, although "straight polarity" or connection of the work to the positive output terminal of the welding apparatus has been employed in each of the embodiments illustrated in the drawings, "reverse polarity" or connection of the work to the negative output terminal may likewise be used. The reactance in the welding circuit is in any case essential for proper operation of the rectifying apparatus.

It is to be understood that other embodiments of the invention are possible, and that the particular embodiments illustrated and described may be modified in various ways, without departing from the spirit of the invention. For example, in the apparatus shown in Figs. 1, 2, 4 and 5, a potentiometer may be substituted for the main transformer supplying the open-circuit voltage of the apparatus, although such potentiometer would not operate as efficiently.

What is claimed is:

1. In an arc welding apparatus for supplying direct current to a welding circuit from an alternating current source, which apparatus comprises full-wave rectifying means, and means for supplying alternating voltage from said source to the input terminals of said rectifying means and for supplying the voltage rectified to the welding circuit; means for causing the curve of rectified current-voltage output at the work in the welding circuit to assume a falling characteristic, including a transformer, the electromotive forces in the mutually coupled windings of said transformer both increasing to increasingly reduce the alternating voltage supplied to said input terminals from open-circuit to short-circuit conditions at the work in the welding circuit.

2. In an arc welding apparatus for supplying direct current to a welding circuit from an alternating current source, which apparatus comprises full-wave rectifying means, and means for supplying alternating voltage from said source to the input terminals of said rectifying means and for supplying the voltage rectified to the welding circuit; means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a drooping characteristic, including a transformer having its magnetization increased by both its mutually coupled windings from open-circuit to short-circuit conditions at the work in the welding circuit.

3. In an arc welding apparatus for supplying direct current to a welding circuit from an alternating current source, which apparatus comprises full-wave rectifying means, means for supplying alternating voltage from said source to the input terminals of said rectifying means and for supplying the voltage rectified to the welding circuit; means for causing the curve of rectified current-voltage output at the work in the welding circuit to assume a falling characteristic, including a transformer the electromotive forces in the mutually coupled windings of said transformer both increasing to increasingly reduce the alternating voltage supplied to said input terminals from open-circuit to short-circuit conditions at the work in the welding circuit, and means for controlling such alternating voltage reduction to provide such a characteristic curve for any one of various operating currents.

4. In an arc welding apparatus for supplying direct current to a welding circuit from an alternating current source, which apparatus comprises full-wave rectifying means, and means for supplying alternating voltage from said source to the input terminals of said rectifying means and for supplying the voltage rectified to the welding circuit; means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a drooping characteristic, including a transformer having its magnetization increased by both its mutually coupled windings from open-circuit to short-circuit conditions at the work in the welding circuit, and means for controlling such alternating voltage reduction to provide the proper drooping characteristic curve which the type of work requires.

5. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit; means for causing the curve of rectified current-voltage output at the work in the welding circuit to assume a falling characteristic, including a transformer, the electromotive forces in the mutually coupled windings of said transformer both increasing to increasingly reduce the alternating voltage supplied to said input terminals from open-circuit to short-circuit conditions at the work in the welding circuit.

6. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit; means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a drooping characteristic, including a transformer having its magnetization increased by both its mutually coupled windings from open-circuit to short-circuit conditions at the work in the welding circuit.

7. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit; means for causing the curve of rectified current-voltage output at the work in the welding circuit to assume a falling characteristic, including a transformer, the electromotive forces in the mutually coupled windings of said transformer both increasing to increasingly reduce the alternating voltage supplied to said input terminals from open-circuit to short-circuit conditions at the work in the welding circuit, and means for controlling such alternating voltage reduction to provide such a characteristic curve for any operating welding current.

8. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit, means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a drooping characteristic, including a transformer having its magnetization increased by both its mutually coupled windings from open-circuit to short-circuit conditions at the work in the welding circuit, and means for controlling such alternating voltage reduction to provide the proper drooping characteristic curve which the type of work requires.

9. In an arc welding apparatus for supplying direct current to a welding circuit from an alternating current source, which apparatus comprises full-wave rectifying means and means for supplying alternating voltage from said source to the input terminals of said rectifying means and for supplying the voltage rectified to the welding circuit; transformer means increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a falling characteristic.

10. In an arc welding apparatus for supplying direct current to a welding circuit from an alternating current source, which apparatus comprises full-wave rectifying means and means for supplying alternating voltage from said source to the input terminals of said rectifying means and for supplying the voltage rectified to the welding circuit; transformer means increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a falling characteristic, and means cooperating with said transformer means for controlling such alternating voltage reduction to provide such a characteristic curve for any one of various operating welding currents.

11. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit; transformer means increasingly reducing the alternating voltage supplied to said input terminals from open-circuit to short-circuit conditions at the work in the welding circuit while maintaining in cooperation with said transformer the balanced conditions necessary for a rectified current in the welding circuit of a continuous character, to cause the curve of rectified current-voltage output at the work in the welding circuit to assume a falling characteristic.

12. In an arc welding apparatus for supplying direct current to a welding circuit from an alternating current source, which apparatus comprises a full-wave rectifier, a transformer for supplying alternating voltage from said source to the input terminals of said rectifier, and means for supplying the voltage rectified to the welding circuit; transformer means increasingly reducing the alternating voltage supplied to said input terminals from open-circuit to short-circuit conditions at the work in the welding circuit while maintaining in cooperation with said transformer the balanced conditions necessary for a rectified current in the welding circuit of a continuous character, to cause the curve of rectified current-voltage output at the work in the welding circuit to assume a falling characteristic, and means cooperating with said transformer means for controlling such alternating voltage reduction to provide such a characteristic curve for any one of various operating welding currents.

13. In an arc welding apparatus for supplying direct current to a welding circuit from a source of alternating current, which apparatus comprises full-wave rectifying means, means having an input side connected to said source and an output side connected to the input terminals of said rectifying means for supplying alternating voltage from said source to said input terminals, and means for supplying the voltage rectified to the welding circuit; transformer means increasingly reducing the alternating voltage supplied to said input terminals from open-circuit to short-circuit conditions at the work in the welding circuit while maintaining in cooperation with said alternating-voltage-supply-means the balanced conditions necessary for a rectified current in the welding circuit of a continuous character, to cause the curve of rectified current-voltage output at the work in the welding circuit to assume a falling characteristic, said transformer means having one side thereof connected in said input side and the other side thereof connected in said output side and operating on open-circuit at the work in the welding circuit below saturation of its iron.

14. In an arc welding apparatus for supplying direct current to a welding circuit from a source of alternating current, which apparatus comprises full-wave rectifying means, means having an input side connected to said source and an output side connected to the input terminals of said rectifying means for supplying alternating voltage from said source to said input terminals, and means for supplying the voltage rectified to the welding circuit; transformer means increasingly reducing the alternating voltage supplied to said input terminals from open-circuit to short-circuit conditions at the work in the welding circuit while maintaining in cooperation with said alternating-voltage-supply-means the balanced conditions necessary for a rectified current in the welding circuit of a continuous character, to cause the curve of rectified current-voltage output at the work in the welding circuit to assume a falling characteristic, said transformer means having one side thereof connected in said input side and the other side thereof connected in said output side and operating on open-circuit at the work in the welding circuit below saturation of its iron, and means for controlling such alternating voltage reduction to provide such a characteristic curve for any one of various operating welding currents.

15. In an arc welding apparatus for supplying direct current from an alternating current source to a welding circuit, which apparatus comprises a full-wave rectifier, means for supplying alternating voltage from said source to the anodes of said rectifier, said means having an input side connected to said source and an output side connected to said anodes, and further means for supplying the voltage rectified to the welding circuit; two identical transformers having their primaries connected in said input side and their secondaries connected in said output side, said secondaries both opposing the alternating voltage supplied to said anodes and being each connected between one anode and said alternating-voltage-supply-means, said transformers preserving the balanced conditions necessary for a rectified current in the welding circuit of a continuous character and operating on open-circuit at the work in the welding circuit below saturation of their magnetic cores to increasingly reduce the alternating voltage supplied to said anodes to cause the curve of rectified current-voltage output at the work in the welding circuit to assume a falling characteristic.

16. An arc welding apparatus for supplying direct current from an alternating current source to a welding circuit, comprising a full-wave rectifier having anodes and a cathode, and three transformers having their primaries series connected to said source and their secondaries series connected to said anodes, one of said transformers supplying alternating voltage to said anodes, said welding circuit being supplied with welding current from said cathode and the midpoint of the secondary of said one of said transformers, the other two transformers being identical and both opposing the alternating voltage supplied to said anodes, the secondaries of said identical transformers being each connected between one anode and the secondary of said one of said transformers, said identical transformers preserving the balanced conditions necessary for a rectified current in the welding circuit of a continuous character and operating on open-circuit at the work in the welding circuit below saturation of their magnetic cores to increasingly reduce the alternating voltage supplied to said anodes to cause the curve of rectified current-voltage output at the work in the welding circuit to assume a falling characteristic.

17. An arc welding apparatus for supplying direct current from an alternating current source to a welding circuit, comprising a full-wave rectifier having anodes and a cathode, three transformers having their primaries series connected to said source and their secondaries series connected to said anodes, one of said transformers supplying alternating voltage to said anodes, said welding circuit being supplied with welding current from said cathode and the midpoint of the secondary of said one of said transformers, the other two transformers being identical and both opposing the alternating voltage supplied to said anodes, the secondaries of said identical transformers being each connected between one anode and the secondary of said one of said transformers, said identical transformers preserving the balanced conditions necessary for a rectified current in the welding circuit of a continuous character and operating on open-circuit at the work in the welding circuit below saturation of their magnetic cores to increasingly reduce the alternating voltage supplied to said anodes to cause the curve of rectified current-voltage output at the work in the welding circuit to assume a falling characteristic, and means cooperating with said identical transformers for controlling such alternating voltage reduction to provide such a characteristic curve for any one of various operating welding currents.

18. In an arc welding apparatus for supplying direct current to a welding circuit from a source of alternating current, which apparatus comprises full-wave rectifying means, means having an input side connected to said source and an output side connected to the input terminals of said rectifying means for supplying alternating voltage from said source to said input terminals, and means for supplying the voltage rectified to the welding circuit; means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a falling characteristic, including a transformer having its primary winding connected in said side and a secondary winding connected in said output side, said transformer having its magnetization increased by both its primary winding and its secondary winding from open-circuit to short-circuit conditions at the work at the welding circuit.

19. In an arc welding apparatus for supplying direct current to a welding circuit from a source of alternating current, which apparatus comprises full-wave rectifying means, means having an input side connected to said source and an output side connected to the input terminals of said rectifying means for supplying alternating voltage from said source to said input terminals, and means for supplying the voltage rectified to the welding circuit; means for increasingly reducing the alternating voltage supplied to said input terminals from open-circuit to short-circuit conditions at the work in the welding circuit while maintaining the balanced conditions necessary for a rectified current in the welding circuit of a continuous character, to cause the curve of rectified current-voltage output at the work in the welding circuit to assume a falling characteristic, including a transformer having its primary winding connected in said side and its secondary winding connected in said output side, said transformer having its magnetization increased by both its primary winding and its secondary winding from open-circuit to short-circuit conditions at the work at the welding circuit, and means for controlling such alternating voltage reduction to provide such a characteristic curve for any one of various operating welding currents.

20. An arc welding apparatus for supplying direct current from an alternating current source to a welding circuit, comprising a full-wave rectifier having anodes and a cathode, and two transformers having a mutual secondary connected to said anodes and their respective primaries series connected to said source, one of said transformers supplying alternating voltage to said anodes and the other of said transformers opposing the alternating voltage supplied to said anodes, said welding circuit being supplied with welding current from said cathode and the midpoint of said mutual secondary, said voltage-opposing transformer operating on open-circuit at the work in the welding circuit below saturation of its iron to increasingly reduce the alternating voltage supplied to said anodes to cause the curve of rectified current-voltage output at the work in the welding circuit to assume a falling characteristic.

21. An arc welding apparatus for supplying direct current from an alternating current source to a welding circuit, comprising a full-wave rectifier having anodes and a cathode, two transformers having a mutual secondary connected to said anodes and their respective primaries series connected to said source, one of said transformers supplying alternating voltage to said anodes and the other of said transformers opposing the alternating voltage supplied to said anodes, said welding circuit being supplied with welding current from said cathode and the midpoint of said mutual secondary, said voltage-opposing transformer operating on open-circuit at the work in the welding circuit below saturation of its iron to increasingly reduce the alternating voltage supplied to said anodes to cause the curve of rectified current-voltage output at the work in the welding circuit to assume a falling characteristic, and means cooperating with the primary of said voltage-opposing transformer for controlling such alternating voltage reduction to provide such a characteristic curve for any one of various operating welding currents.

22. In an arc welding apparatus for supplying direct current to a welding circuit from an alternating current source, which apparatus comprises a full-wave rectifier, means for supplying alternating voltage from said source to the anodes of said rectifier, said means having an output circuit connected to said anodes, and means for supplying the voltage rectified to the welding circuit; transformer means having two inductively coupled windings of equal construction and oppositely disposed in said output circuit to both oppose the alternating voltage supplied to said anodes said transformer means having its magnetization increased by both of said windings from open-circuit to short-circuit conditions at the work in the welding circuit and increasingly reducing the alternating voltage supplied to said anodes to cause the curve of rectified current-voltage output at the work in the welding circuit to assume a falling characteristic.

23. An arc welding apparatus for supplying direct current from an alternating current source to a welding circuit, comprising a full-wave rectifier having anodes and a cathode, a transformer for supplying alternating voltage from said source to said anodes and having its primary connected to said source, and a second transformer having two windings identical in construction, each of said windings being connected between one anode and the secondary of said first transformer to oppose the alternating voltage supplied to said anodes, said welding circuit being supplied with the rectified voltage from said cathode and the midpoint of the secondary of said first transformer, said second transformer having its magnetization increased by both of its windings from open-circuit to short-circuit conditions at the work in the welding circuit and increasingly reducing the alternating voltage supplied to said anodes to cause the curve of rectified current-voltage output at the work in the welding circuit to assume a falling characteristic.

24. An arc welding apparatus for supplying direct current from an alternating current source to a welding circuit, comprising a full-wave rectifier having anodes and a cathode, a transformer for supplying alternating voltage from said source to said anodes and having its primary connected to said source, a second transformer having two windings identical in construction, each of said windings being connected between one anode and the secondary of said first transformer to oppose the alternating voltage supplied to said anodes, said welding circuit being supplied with the rectified voltage from said cathode and the midpoint of the secondary of said first transformer, said second transformer having its magnetization increased by both of its windings from open-circuit to short-circuit conditions at the work in the welding circuit and increasingly reducing the alternating voltage supplied to said anodes to cause the curve of current-voltage output at the work in the welding circuit to assume a drooping characteristic, and means cooperating with said windings for controlling such alternating voltage reduction to provide such a characteristic curve for any one of various operating welding currents.

ALEXANDER CHURCHWARD.